United States Patent
Cheney, Jr.

[11] Patent Number: 5,689,909
[45] Date of Patent: Nov. 25, 1997

[54] PROJECTING FISHING POLE

[76] Inventor: Clyde L. Cheney, Jr., 462 Sego Ave., Salt Lake City, Utah 84111

[21] Appl. No.: 621,890

[22] Filed: Mar. 26, 1996

Related U.S. Application Data

[62] Division of Ser. No. 316,840, Oct. 3, 1994, Pat. No. 5,507,112.

[51] Int. Cl.$^6$ ............................................. A01K 91/02
[52] U.S. Cl. ............................................................ 43/19
[58] Field of Search ............................... 43/19; 124/17

[56] References Cited

U.S. PATENT DOCUMENTS

| | | | |
|---|---|---|---|
| 2,187,807 | 1/1940 | Muckey | 43/19 |
| 2,932,111 | 4/1960 | Kremski | 43/19 |
| 2,977,706 | 4/1961 | Merz | 43/19 |
| 3,172,226 | 3/1965 | Andis | 43/19 |
| 3,279,115 | 10/1966 | Worsham | 43/19 |
| 3,400,480 | 9/1968 | Worsham | 43/19 |
| 3,416,256 | 12/1968 | Blocker | 43/19 |
| 3,419,991 | 1/1969 | Mitchell | 43/19 |

FOREIGN PATENT DOCUMENTS

| | | | |
|---|---|---|---|
| 213230 | 12/1955 | Australia | 43/19 |
| 58068 | 9/1953 | France | 43/19 |

*Primary Examiner*—Kurt Rowan
*Attorney, Agent, or Firm*—Terry M. Crellin

[57] ABSTRACT

A fishing bobber comprises a water tight air chamber having an guide tube passing therethrough. A slide tube slides back and forth within the guide tube. A housing extends downwardly from the air chamber, and the housing has an open bottom end. The lower end of an elongate slide tube is attached to a circular reel member that has a recessed groove circumscribing its perimeter. The reel member is of a size that when the slide tube slides downwardly, the reel member moves out of the lower end of the housing to a position spaced below the open, bottom end of the housing. When the slide tube slides upwardly, the reel member moves into the open end of the housing. A fishing line is attached to the bobber, and a leader portion of the fishing line that extends from the bobber. The leader portion can be wrapped around the recessed groove of the reel member. The hook and bait is placed in the housing, and the reel member is then moved into the open end of the housing to retain the hook and bait securely in the housing as the bobber is being cast over a body of water. Upon landing in the water, the bobber floats in an upright position, and the reel member moves out of the open end of the housing so that the hook and bait are released into the water.

1 Claim, 3 Drawing Sheets

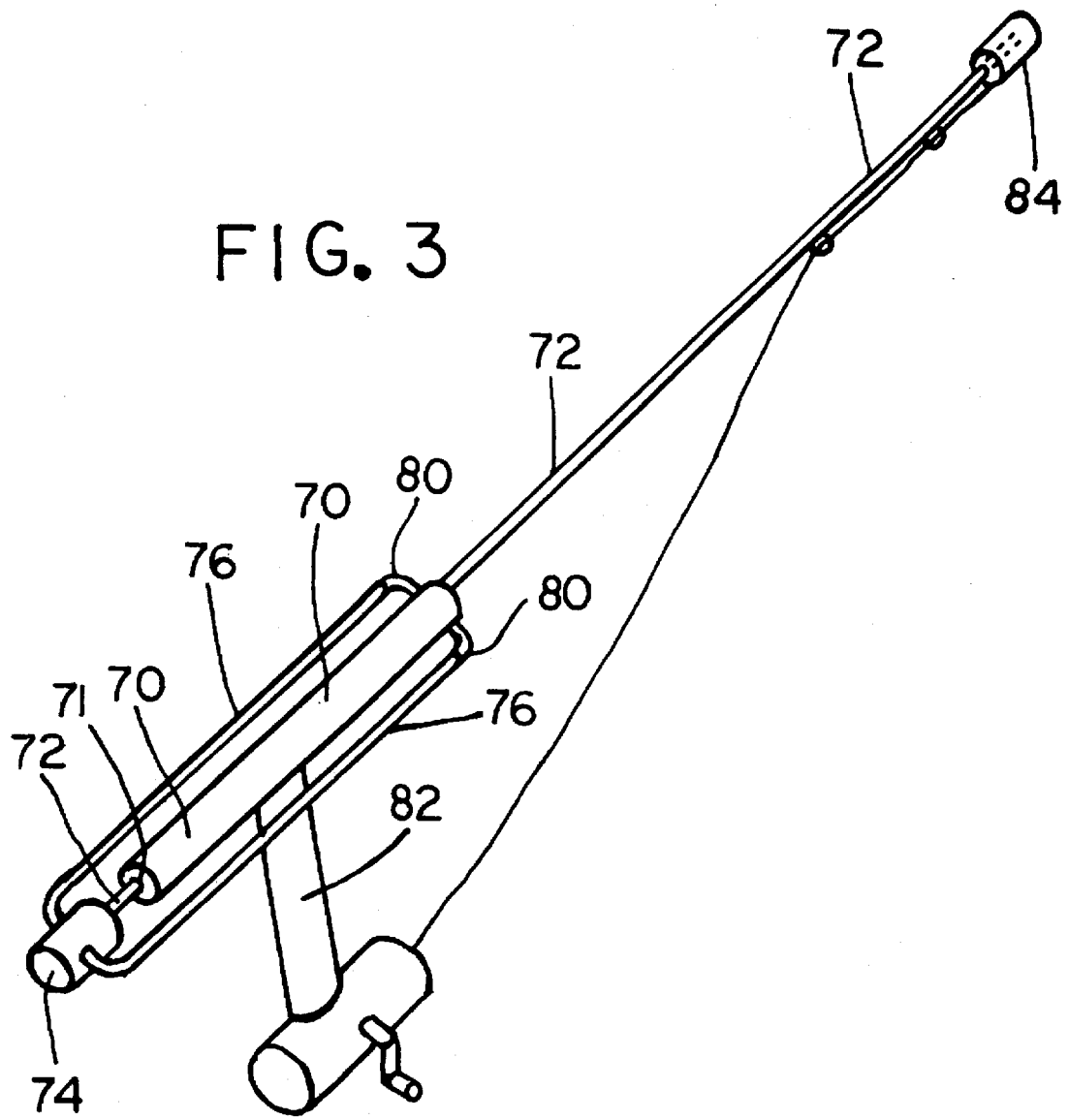

5,689,909

PROJECTING FISHING POLE

This application is a division of application Ser. No. 08/316,840 filed Oct. 3, 1994 now U.S. Pat. No. 5,507,112.

BACKGROUND OF THE INVENTION

1. Field of the Invention

The present invention relates to a fishing bobber that has a protective chamber for holding bait. In addition, the present invention relates to a fishing pole having a launch mechanism powered by an elongate elastic member for launching the bobber or other weight from the distal end of the fishing pole.

2. State of the Art

Fishing bobbers are well known in the art. The bobbers commonly have a watertight air chamber, and because of the material that they are made of and their bulk provide a weight which facilitates casting a fishing line from a fishing pole. The bobbers have conventionally been attached to the fish line, with a leader extending from the bobber to a hook at the end of the leader. Bait is impaled on the hook and the fishing pole is used to cast the bobber and the bait over a body of water. The length of the leader is limited because an excessive length of leader hanging from the bobber at the end of a fishing pole is hard to control. Further, the bait gets damaged by the whipping of the leader that hangs from the bobber during casting of the bobber and line over the body of water.

A fishing bobber is shown in U.S. Pat. No. 4,809,461 that has a watertight air chamber and a water chamber that has an open top. The water chamber is filled with water and a line bait is attached to the fish line and then placed in the compartment containing the water. The bobber is then cast out into a body of water. The line bait is protected from excessive injury when the bobber hits the water, and the live bait exits the water filled chamber through its upper end which sinks in the water due to the air chamber floating on the water. Live bait such as minnows will swim out of the water filled chamber, but other bait such as worms often do not exit the water filled chamber. There is no provision in the bobber of U.S. Pat. No. 4,809,461 for handling the length of leader between the line which is tied to the bobber and the bait at the end of the leader. The leader can become entangled about the bobber and restrain the live bait from exiting the water chamber, especially when the live bait is a worm.

Fishing rods have been proposed for projecting or launching a lure, bait, float or sinker with a fishing line attached thereto. Devices have been disclosed that use compressed gases. See for example U.S. Pat. Nos. 3,834,056 and 4,110,929. In U.S. Pat. No. 4,631,852 a solid propellant rocket motor is even suggested. All the devices that use compressed air or other propellants such as a rocket motor are complex, expensive and generally impractical as well as being hazardous to use.

A more sensible casting rod is shown in U.S. Pat. No. 3,656,252 wherein a launching rod is forced backwardly into a spring containing chamber. The spring provides a force against the launching rod, and when the device is fired, the launching rod moves rapidly forward and launches a weight to be cast from the distal end of the launching rod. The actual fishing rod is displaced downwardly from the launching rod and the fishing line is fed out through the distal end of the fishing rod and then doubled back to the launching rod. The fishing line thus experiences a sever whipping action as it is being cast, and the line in many instances can be broken or damaged to where it is unusable. The bait or lure on the fishing line experiences the same whipping action, and the bait or lure can be damaged beyond being useful.

OBJECTS AND BRIEF DESCRIPTION OF THE INVENTION

One object of the present invention is to provide a fishing bobber that has a protected chamber in which bait on a hook can be placed, and when the bobber lands in a body of water it floats so as to open the protected chamber and allow the bait on the hook to drop from the bobber into the water.

An additional objective of the present invention is to provide such a fishing bobber that has a reel for storing a length of leader that is attached between a fishing line and the hook and bait, with the leader being wrapped on the reel and the reel is positioned in a protective cover when the bobber is being cast and further when the bobber lands in a body of water, the reel is exposed so as to release the length of leader.

A further objective of the present invention is to provide such a fishing bobber that has means for being mounted on a distal, blunt end of a fishing pole wherein the fishing pole is adapted to project the bobber from the fishing pole during casting.

A still further objective of the present invention is to provide a novel fishing pole having a distal, blunt end that can be retracted against the force of an elongate, elastic member, and when released from the retracted position, projects instantaneously forward to project a bobber or other weight from the distal end of the fishing pole.

The above objectives are achieved in accordance with the present invention by providing novel, unique fishing bobber that has a watertight and airtight air chamber and a housing that extends downwardly from the air chamber to form an open chamber immediately below the sealed air chamber. This open chamber is closed at its upper end by the lower end of the air chamber, and the housing is open at its distal end opposite the air chamber to form the open end of the open chamber formed by the housing. An elongate guide tube passes through the central portion of the air chamber from the upper end of the air chamber to the lower end thereof. The guide tube is open at both its ends, and the lower end opens into the open chamber formed by the housing that extends downwardly from the air chamber. The guide tube is sealed to the air chamber so that the air chamber remains airtight and watertight.

An elongate, hollow slide tube is mounted longitudinally within the guide tube so that the hollow slide tube can move longitudinally back and forth within the guide tube. A first end of the slide tube extends from the upper end of the guide tube at the upper end of the air chamber, and the second end of the slide tube extends from the lower end of the guide tube at the lower end of the air chamber.

The lower, second end of the slide tube extends through the open chamber formed by the housing and projects from the open end of the open chamber formed by the housing. A circular reel member is attached around the slide tube adjacent to the second end of the slide tube. The reel member has a circular perimeter that encircles the slide tube, and the circular perimeter of the reel member is provided with a recessed groove circumscribing the perimeter of the reel member. The perimeter of the reel member has a size such that the reel member can be received within the open bottom end of the housing.

When the slide tube slides upwardly through the guide tube in a direction of the upper end of the air chamber, the reel member moves so that it is received within the open end of the housing. The reel member makes a close fit with the open end of the housing such that the reel member in essence closes the otherwise open chamber formed by the housing. When the slide tube slides downwardly through the guide tube in a direction toward the lower end of the housing, the reel moves out of the open end of the housing to a position spaced below the open, bottom end of the housing.

A fishing line an pass through the slide tube so as to extend from the second end of the slide tube. The leader portion of the fishing line that extends from the fishing line at the second end of the slide tube can be wrapped around the recessed groove in the reel, and the hook at the end of the leader portion of the fish line, and any bait on the hook, is placed in the housing and the slide tube is moved upwardly through the guide tube so that the reel is received in the housing. The hook and bait is retained in the housing above the reel to hold the bait securely in the housing of the bobber as the bobber and line is being cast out over a body of water. The leader portion of the fish line that is wrapped on the reel is also securely retained on the reel in the housing as the bobber is being cast.

When the cast bobber lands in the water, the bobber floats in an upright position so that the slide tube slides downwardly from the housing. The reel moves out of the open end of the housing so that the housing is open. The hook and bait contained in the housing drop into the body of water through the open end of the housing, and the leader portion of the fish line unwinds from the reel allowing the hook and bait to sink into the body of water.

To aid in maintaining the reel properly inserted in the open end of the housing during the casting of the bobber, a magnetic member is attached to the lower end of the air chamber, and a holding member made of a material that is magnetically attachable to the magnetic member is mounted on the slide tube so that the holding member engages the magnetic member when the slide tube is moved to its upwardly extending position with the reel received in the open end of the housing. The engagement of the holding member to the magnetic member holds the reel in the open end of the housing of the bobber during casting of the bobber.

When the bobber lands in the body of water, it floats in an upright position with the housing positioned vertically below the air chamber. Gravity pulls the reel and the slide tube downwardly to open the open end of the housing and release the hook and bait from the housing and allow the leader portion of the fishing line to unwind from the reel. A weight can be incorporated into the reel to aid in separating the catch member from the magnetic member to allow the reel and slide tube to move downwardly.

The fishing bobber of the present invention is advantageously adapted to be engaged to a blunt, distal end of a fishing pole which is used in casting the bobber and fishing line into a body of water. Part of the present invention includes a novel fishing pole for that purpose. The novel fishing pole comprises an elongate tubular handle that has an elongate, linear passage extending from the first end to the second end thereof.

An elongate rod extends coaxially through the elongate passage in the handle so that a first end of the rod extends from the distal end of the handle and forms a blunt, distal end for receiving a weight such as the fishing bobber. A second end of the rod extends from the proximal end of the handle, and a hand grasp is provided on the second end of the rod. An elongate elastic member extends from the distal end of the handle along the handle to the hand grasp. The hand grasp and the rod can be pulled backward to extend the elastic member and when the hand grasp is released, the rod is rapidly projected forward and will project a weight, such as the bobber of the present invention, from the blunt, distal end of the fishing pole.

Additional objects and features of the invention will become apparent from the following detailed description, taken together with the accompanying drawings.

THE DRAWINGS

Preferred embodiments of the present invention representing the best modes presently contemplated of carrying out the invention are illustrated in the accompanying drawings in which:

FIG. 3 is a pictorial view of a novel fishing pole in accordance with the present invention.

DETAILED DESCRIPTION OF THE ILLUSTRATED EMBODIMENTS

Figure 1:
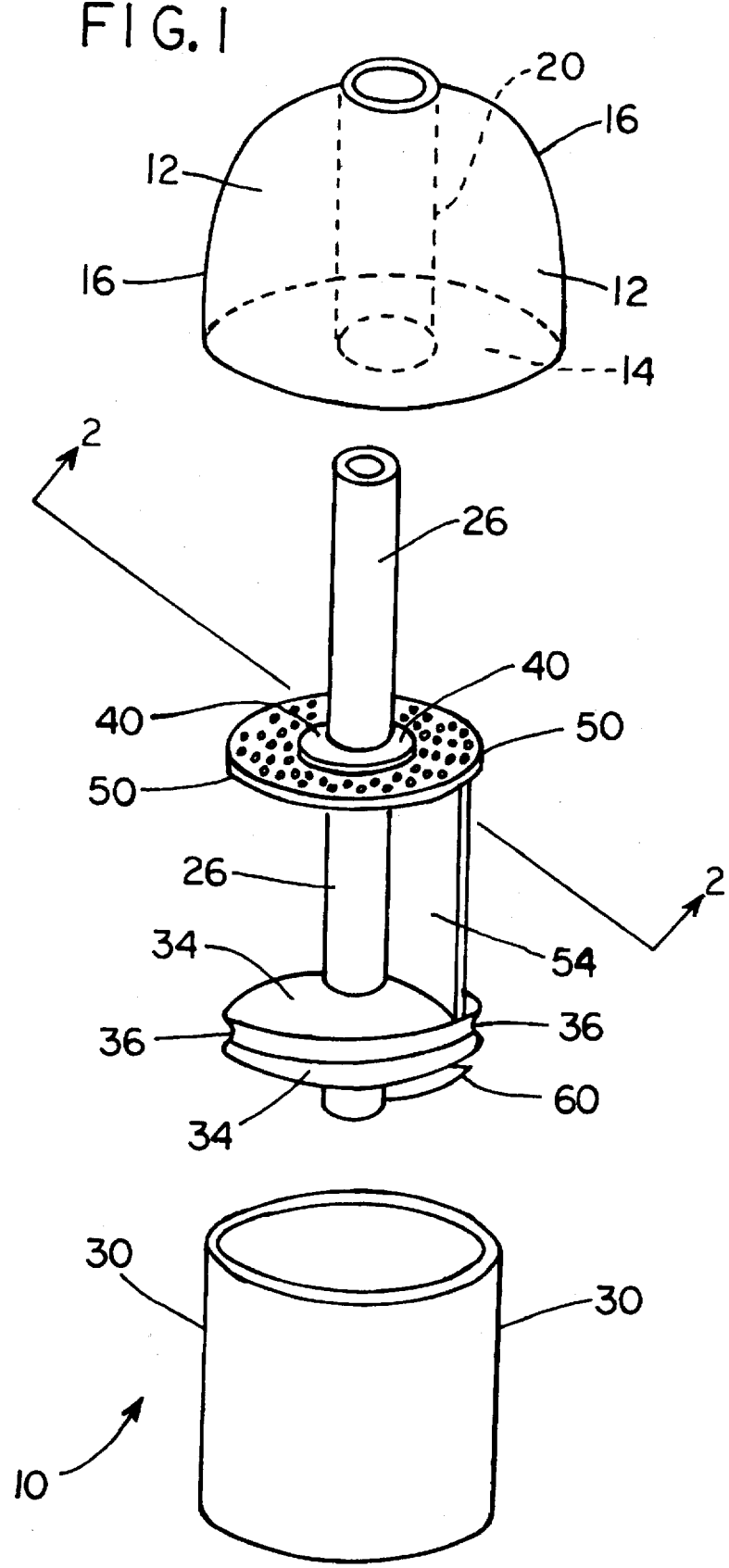
FIG. 1 is an exploded pictorial representation of a fishing bobber in accordance with the present invention.
Figure 2:
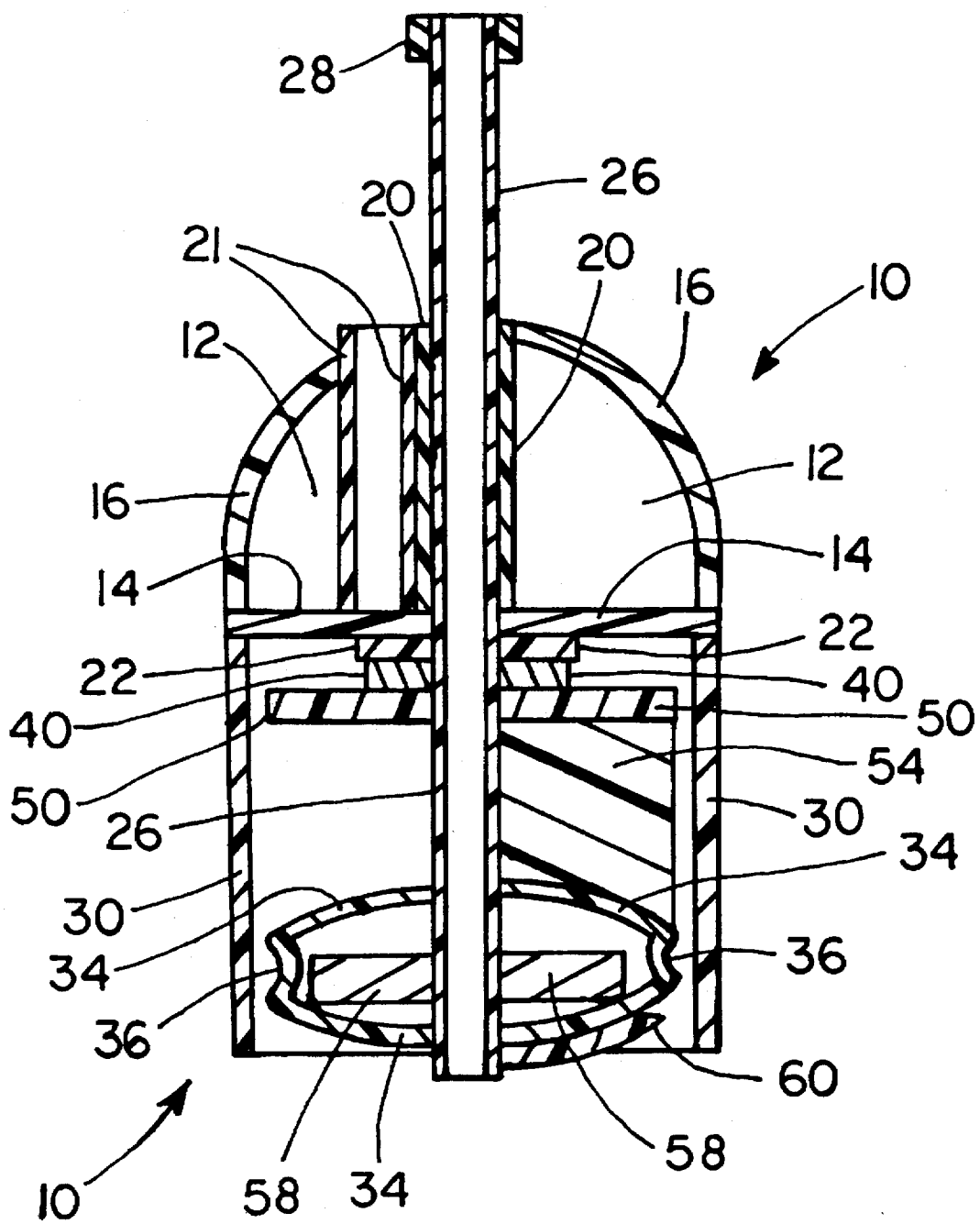
FIG. 2 is a cross section taken on line 2—2 of FIG. 1 showing the bobber with the reel received in the open end of the housing.

Referring now to the drawings, and in particular to FIGS. 1 and 2, one preferred embodiment of a fishing bobber 10 in accordance with the present invention comprises a water tight air chamber 12. The air chamber 12 is formed of a plastic material. As illustrated, the air chamber 12 has a lower end 14 that has a circular perimeter. A domed-shaped member 16 extends upwardly from the perimeter of the lower end 14 so as to form a water tight space in the domed-shaped member 16 above the lower end 14.

An elongate guide tube 20 passes through the central portion of the air chamber 12 from the upper end at the peak of the domed-shaped member 16 to the lower end 14. The upper end of the guide tube 20 passes through the upper end of the dome-shaped member 16 so that the guide tube 20 is open at its upper end at the upper end of the air chamber 12, and the lower end of the guide tube 20 passes through the lower end 14 of the air chamber 12 so that the guide tube 20 is open at is lower end at the lower end 14 of the air chamber 12. The perimeter of the guide tube 20 is sealed near its upper end to the upper end of the dome-shaped member 16, and the perimeter of the guide tube 20 near its lower end is sealed to the lower end 14 of the air chamber 12. The space within the air chamber 12 remains water tight, with the guide tube 20 passing therethrough so that the open, upper end of the guide tube 20 faces upwardly from the upper end of the air chamber 12 and the open, lower end of the guide tube 20 faces downwardly from the lower end 14 of the air chamber 12.

A magnetic member 22 is attached to the outer, lower surface of the lower end 14 of the air chamber 12. As illustrated, the magnetic member 22 consists of a substantially flat ring that resembles a round washer. The magnetic member 22 is positioned coaxially around the open, lower end of the guide tube 20. The magnetic member 22 is preferably made of a polymeric material that contains a magnetized filler so as to render the material magnetic.

An elongate, hollow slide tube 26 is mounted to slide longitudinally back and forth within the guide tube 20. The slide tube 26 has a first end that extends from the upper end of the air chamber 12 through the open, upper end of the guide tube 20. The second end of the slide tube 26 extends from the lower end of the air chamber 12 through the open, lower end of guide tube 20. A stop member 28 in the form of a ring is positioned adjacent to the open, upper end of the hollow slide tube 26. The stop member 28 is sized such that it can not enter the guide tube 20 and thus it prevents the slide tube 26 from falling completely through the guide tube 20 and out the lower end of the guide tube 20. The slide tube 26 is sized smaller than the guide tube 20 so that the slide tube 26 is received somewhat loosely in the guide tube 20 for sliding movement back and forth in the guide tube 20.

A housing 30 extends downwardly from the perimeter of the lower end 14 of the air chamber 12. The housing 30 has an open bottom end through which the second end of the slide tube 26 extends. The housing 30 is closed at its upper end by the lower end 14 of the air chamber 12.

A circular reel member 34, having a recessed groove 36 circumscribing the perimeter of the circular reel member 34, is firmly attached adjacent to the second end of the elongate slide tube 26. The lower, open end of the slide tube 26 opens downwardly from the lower side of the circular reel member 34. The perimeter of the circular reel member 34 has a size such that the reel member 34 can be received within the open bottom end of the housing 30. With the reel member 34 being firmly attached adjacent to the second end of the elongate slide tube 26, when the slide tube 26 slides downwardly through the guide tube 20 in a direction toward the housing 30, i.e., in a downward direction, the circular reel member 34 moves to a position spaced below the open, bottom end of the housing 30. When the slide tube 26 slides 26 back upwardly through the guide tube 20 in a direction away from the housing 30, i.e., in an upward direction, the circular reel member 34 moves so that it is received within the open end of the housing 30.

A holding member 40 made of a material that is magnetically attachable to the magnetic member 22 is mounted on the slide tube 26 such that the holding member 40 engages the magnetic member 22 when the slide tube 26 is moved to its upwardly extending position and the reel member 34 is received in the open end of the housing 30. The holding member 40 advantageously consists of a metal washer that is received coaxially around the slide tube 26. The holding member 40 is positioned in the intermediate portion of the slide tube 26 such that when the slide tube 26 moves upwardly, the holding member 40 contacts the magnetic member 22 after the reel member 34 has just entered the open, lower end of the housing 30. The magnetic engagement between the magnetic member 22 and the holding member 40 stabilizes the slide tube 26 in its upward position to maintain the reel member 34 in its position closing the lower end of the housing 30.

The reel member 34 just enters the lower end of the housing 30 so as to effectively close the lower end of the housing, with the lower end of the housing encircling the recessed groove 36 in the perimeter of the reel member 34 when the slide tube 26 and reel member 34 move to their upward position. The remainder of the housing 30 forms a lower chamber that is used to hold a hook and bait impaled on the hook.

In use, a fishing line passes through the slide tube 26 so as to extend from the second end of the slide tube 26. The end portion of the line, generally consisting of a leader of clear monofilament material, extends from the second end of the slide tube 26. In preparation for casting the bobber and line out into a body of water, the leader portion, i.e., the end portion of the fishing line, is wrapped around the recessed groove 36 of the reel member 34. A hook at the end of the line and any bait on the hook is placed in the lower chamber formed by the housing 30. The slide tube 26 is then moved upwardly through the guide tube 20 so that the reel member is received in the lower open end of the housing 30. The hook and bait is retained in the housing 30 above the reel member 34 to hold the bait securely in the housing 30 as the bobber is cast out over a body of water.

The engagement between the magnetic member 22 and the holding member 40 retains the reel member 34 in its position closing the lower end of the housing 30 to safely retain the hook and boat within the housing 30 as the bobber is cast over the body of water. When the cast bobber lands in the water, the bobber floats in an upright position. The weight of the side tube 26 and reel member 34 pulls the slide tube 26 downwardly and the reel member 34 moves downwardly from the housing 30 to open the lower end of the housing 30. In addition, the line wrapped on the reel member 34 is released or allowed to unwrap, and the hook and bait at the end of the line drops into the water along with the leader.

It is advantageous to provide a perforated disc 50 on the elongate, hollow slide tube 26. The perforated disc 50 has a diameter such that the perforated disc 50 can move back and forth in the housing 30 as the slide tube 26 moves back and forth. The perforated disc 50 is positioned on the slide tube 26 so that the perforated disc 50 moves to the upper end of the housing 30 when the reel member 34 is received in the housing 30. The perforated disc 50 acts as a sweep to move the hook and bait at the end of the line out of the bottom end of the housing 30 when the bobber floats in an upright position on a body of water.

A divider plate 54 is also preferably located between the reel member 34 and the perforated disc 50. The divider plate 54 is oriented in a plane passing through the longitudinal axis of the slide tube 26 so that the divider plate 54 prevents bait on the hook at the end of the line from becoming entangled around the slide tube 26.

To aid in pulling the slide tube 26 and reel member 34 downward when the bobber floats upright in the water, a weight 58 can be associated with the reel member 34. The weight, as illustrated, includes a metal weight that is placed within the reel member 34. The metal weight 58 is advantageously a metal washer that is placed within the reel member 34.

A catch member 60 is advantageously provided at the perimeter of the recessed groove 36 in the reel member 34 to catch and hold the line or leader at the perimeter of the reel member 34 as the line or leader is wrapped around the recessed groove 36 in the reel member 34.

The fishing bobber of the present invention is advantageously provided with means for engaging the fishing bobber to a blunt, distal end of a fishing pole that is adapted to be used in projecting the fishing bobber and line attached thereto over a body of water. The means for engaging the fishing bobber to the blunt, distal end of a fishing pole comprises an elongate, engagement tube 21 that has an open end and a closed end. The engagement tube 21 is positioned within the air chamber 12, with the open end of the engagement tube 21 being located adjacent to the upper end of the air chamber 12. The open end of the engagement tube 21 makes a water tight seal with the upper end of the air chamber 12, and the closed end of the engagement tube 21 is located within the air chamber 12. Preferably, the engagement tube 21 is positioned alongside the guide tube 20.

As illustrated in FIG. 3, a novel fishing pole is shown that is highly useful in casting the bobber over a body of water.

The fishing pole comprises an elongate, tubular handle 70 having first and second ends. The handle 70 has an elongate, linear passage extending from the first end to the second end thereof. Means are provided for attaching a fishing reel to the handle 70 as are well known in the art. Those means will not be further elucidated here.

An elongate rod 72 having a proximal end and a distal end is received within the elongate passage 71 in the handle 70 for longitudinal sliding movement back and forth in the elongate passage of the handle 70. A distal end of the rod 72 extends from the first end of the handle 70 to form a blunt end of the fishing pole. The proximal end of the rod 72 extends from the second end of the handle 70, and a hand grasp 74 is provided on the proximal end of the rod 72. An elongate elastic member 76 extends from a position next to the first end of the handle 70 to the hand grasp 74. The elongate elastic member is preferably a piece of surgical tubing. The tubing passes through an opening in the handle 70 and the two pieces of tubing then pass along the handle 70 to the first end of the handle 70.

It is advantageous to form two elongate projections 80 that extend in opposite directions from opposite sides of the first end of the handle 70 adjacent to the first end of the handle 70. The elongate projections 80 turn back toward the second end of the handle 70. The projections 80 are sized such that the respective ends of the surgical tubing can be slid over the projections 80. Clamps (not illustrated) can then be used to securely affix the ends of the surgical tubing to the respective projections 80.

The fishing pole of the present invention is used by grasping the hand grasp 74 with one hand and a portion of the handle 70 with the other hand. It is advantageous to provide a post 82 that extends downwardly from the handle 70 so that a fishing reel can be secured to the downwardly extending, distal end of the post 82, and the post 82 can also be used as the portion of the handle 70 that is grasped by the other hand. The hand grasp 70 is pulled back against the force of the elastic surgical tubing in a manner like one is shooting a bow and arrow.

The elongate rod 72 is pulled back through the handle 70 as the hand grasp 74 is pulled back. When the hand grasp 74 has been pulled back a desired distance, and the end of the rod 72 is aimed in the desired direction, the hand grasp 74 is released. The rod 72 instantaneously moves forward and projects the bobber or other weight 84 at the distal end of the rod 72 from the distal end of the rod 72. The bobber or other weight 84, and a fishing line attached thereto, can be cast over great distances using the fishing pole of the present invention.

The fishing pole need not be swung in a back cast and can thus be used even if there is an obstacle behind the user that would interfere with the casting of a fish line using a conventional fishing pole. The fishing pole of the present invention can be used by elderly uses or one who has disabilities that make it hard or impossible to use a conventional fishing pole. The surgical tubing makes an ideal elastic member for use in providing the instantaneous forward movement of the rod 72. The surgical tubing is inexpensive and can be readily replaced when it becomes worn.

Although preferred embodiments of the bobber and fishing pole of the present invention have been illustrated and described, it is to be understood that the present disclosure is made by way of example and that various other embodiments are possible without departing from the subject matter coming within the scope of the following claims, which subject matter is regarded as the invention.

I claim:

1. A fishing pole comprising
   an elongate, tubular handle having first and second ends, said handle having an elongate, linear passage extending from the first end to the second end thereof;
   means for attaching a fishing reel to said handle;
   an elongate rod having a proximal end and a distal end, said rod being received coaxially through said elongate passage in said handle for longitudinal sliding movement back and forth in said elongate passage, with the distal end of said rod extending from the first end of said handle to form a distal end of said fishing pole, and with the proximal end of said rod extending from the second end of said handle;
   a hand grasp on the proximal end of said rod; and
   an elongate elastic member that is located on the outside of said handle and extends from said handle to said hand grasp,
   whereby said hand grasp and said rod can be pulled backward to extend said elastic member and when said hand grasp is released, the rod is rapidly projected forward and will project a weight and a line from the distal end of said rod.

* * * * *